United States Patent [19]

Schober

[11] 3,809,892

[45] May 7, 1974

[54] ARRANGEMENT FOR HUE EVALUATION

[75] Inventor: Helmut Schober, Taufkirchen, Germany

[73] Assignee: Erwin Sick Optik-Elektronik, Waldkirch, Breisgau, Germany

[22] Filed: Feb. 8, 1973

[21] Appl. No.: 330,576

[30] Foreign Application Priority Data

Feb. 11, 1972 Germany .......................... 2206633

[52] U.S. Cl. .............................. 250/226, 356/178

[51] Int. Cl. .............................................. G01j 3/34

[58] Field of Search ............ 250/226, 219; 356/176, 356/177, 178; 355/38

[56] References Cited

UNITED STATES PATENTS

| | | | |
|---|---|---|---|
| 3,560,757 | 2/1971 | Pugsley | 250/226 |
| 3,572,945 | 3/1971 | Thompson | 356/178 |
| 3,527,540 | 9/1970 | Bowker | 250/226 |
| 3,512,893 | 5/1970 | Faulhaber | 250/226 |
| 3,647,295 | 3/1972 | Dobouney | 356/176 |
| 3,060,790 | 10/1962 | Ward | 250/226 |

*Primary Examiner*—James W. Lawrence
*Assistant Examiner*—D. C. Nelms

[57] ABSTRACT

The present invention relates to a system for hue evaluation to be used with reading devices for example in identifying colour rings on ampoules or on packages. Three photoelectric receivers are utilized, each of which receives one of the three primary colours of the hue to be evaluated, and supplies to an evaluating circuit an electric signal corresponding to the proportion of the respective primary colour in the hue, the evaluating circuit forming from the three signals a hue output signal characteristic of the hue. The invention further provides for the primary colour signals to be applied to a maximum formation stage the output of which serves as a reference signal for the primary colour signals.

6 Claims, 1 Drawing Figure

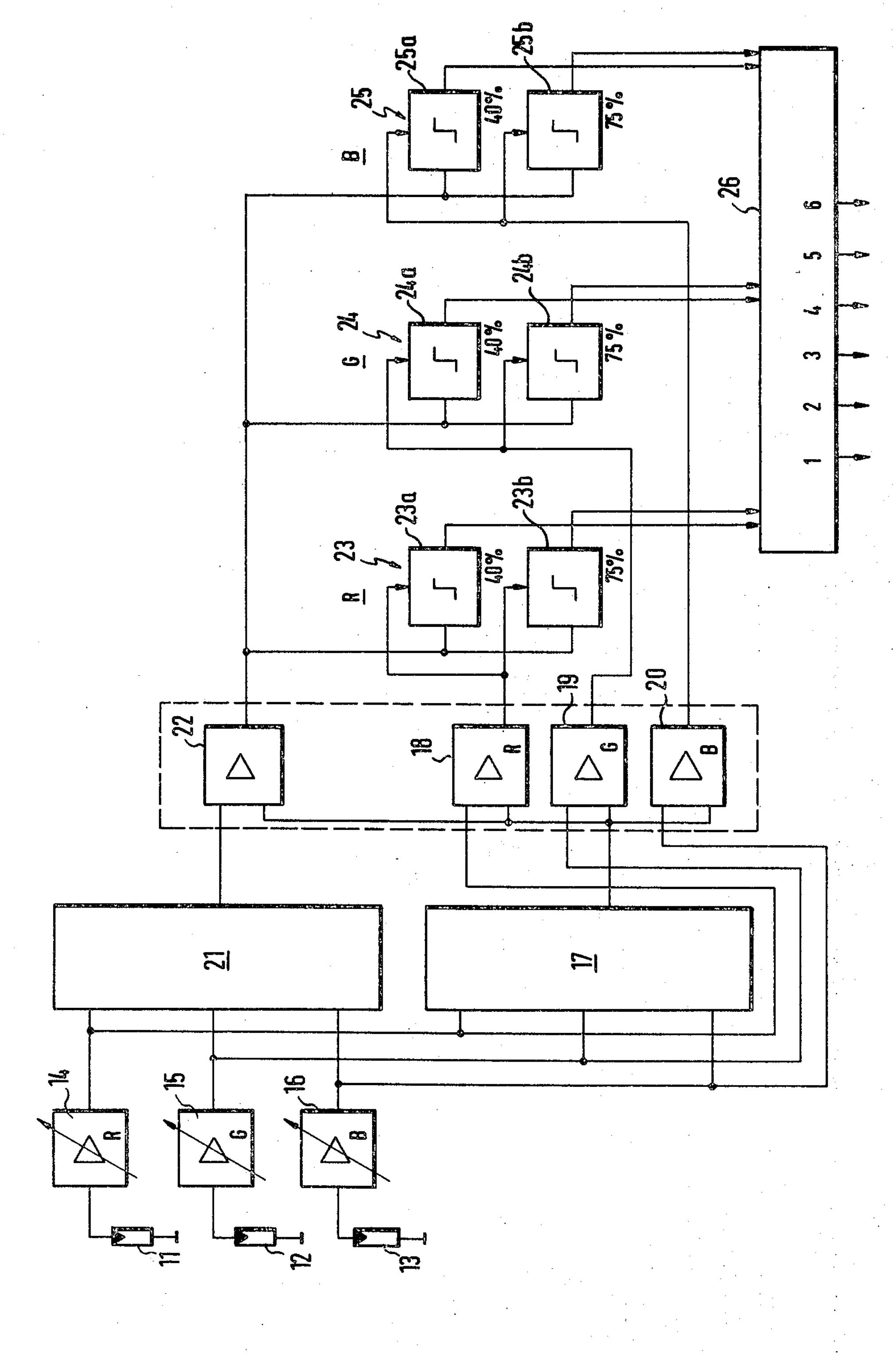
11
12
13
14
15
16
17
18
19
20
21
22
23
23a
23b
24
24a
24b
25
25a
25b
26
R
G
B
40%
75%
1
2
3
4
5
6

ARRANGEMENT FOR HUE EVALUATION

The invention relates to an arrangement for hue evaluation which comprises three photoelectric receivers, each of which receives one of the three primary colours of the hue to be evaluated and supplies to an evaluating circuit an electric signal corresponding to the proportion of the respective primary colour in the hue, the evaluating circuit forming from the three signals a hue evaluation signal characteristic of the hue.

In known arrangements of this kind the reference signal used for primary colour measurement is a fixed response threshold, which however must be made relatively high because in practice ideal primary colours without a white component practically never occur. This relatively high threshold has the disadvantage that mixed colours can be recognised only with difficulty and that moreover the ageing of the colours or of the lighting means, or else of the photoelectric receiver, has a disadvantageous effect.

The object of the invention is an arrangement of the type first mentioned above which in particular enables the primary colour signals appearing at the output of the reading device for colour marks provided on an object in accordance with copending application Ser. No. 298,514 of Oct. 18th, 1972, to be suitably evaluated. In the arrangement described in the earlier application a colour separation mirror is provided which transmits the blue component of the incident light to a first photoelectric receiver and reflects the red and green components to two other photoelectric receivers in front of which filters are disposed to filter out the red and green components respectively. The three photoelectric receivers therefore have electrical output signals the magnitude of which corresponds to the intensity of the primary colour filtered out.

Reading devices of this kind are used, for example, for identifying colour rings on ampoules or on packages.

The aim of the invention now consists in providing an arrangement of the kind first mentioned above with the aid of which a hue can be clearly and correctly identified even when the brightness signal is reduced, for example in the event of insufficiently wide colour marks on the ampoules or packages, without the hue changing, or in the event of the colour not being applied sufficiently thickly on a light ground, so that white shines through and falsifies the brightness signals.

For the purpose of solving this problem the invention provides for the primary colour signals to be applied to a maximum formation stage the output of which serves as a reference signal for the primary colour signals. The primary colour signals formed by the photoelectric receivers are in addition applied to a minimum formation stage the output of which is conjointly applied to one input of each of three colour difference amplifiers, each of the other inputs of which receives one of the primary colour signals while their output is transmitted to a difference amplifier whose other input receives the output signal of a maximum formation stage.

In a preferred embodiment the outputs of the colour difference amplifiers are each fed to an input of a comparator device. The output signal of the maximum difference amplifier is expediently fed to the other input of each comparator device.

In order to be able to take into account different sensitivities of the various photoelectric receivers, a separately adjustable pre-amplifier may conveniently be inserted after each photoelectric receiver, which pre-amplifiers moreover bring the relatively weak photoelectric cell signals to a level which can be satisfactorily processed.

The outputs of each comparator device are preferably applied to a logic device which is provided with a switching amplifier in which the hue output signal is combined from the processed primary colour signals.

In the process according to the invention of forming the difference between the primary colour signals and the minimum value, determined in the minimum formation stage, of the three primary colours, the white component is practically eliminated from the signals. The shining-through of the white ground when colours are not applied sufficiently thickly is thereby, for example, made harmless.

Comparison of the difference signals of the primary colour difference amplifiers with the output of the difference amplifier fed by the maximum formation stage has the consequence that the ageing of the illuminating lamps or the like which are used has no influence on the quality of the measurement. Comparison of the signals in the comparators corresponds to the formation of a quotient.

In a preferred embodiment each comparator device consists of a plurality of idividual comparators with a different response threshold, the outputs of which are separately fed to the logic device and all of which receive the same input signals. In this way fine graduation of the colour scale is possible, because in each comparator device, consisting of a plurality of stages, for the respective primary colour the proportion of that primary colour can be determined in definite stages.

An embodiment which is particularly preferred because of the universal recognition which it permits and the simplicity of its construction is characterised in that each comparator device has two comparators. The response threshold of each first comparator conveniently lies at 40 per cent of the one input in relation to the other, while the response threshold of the second comparator conveniently lies at 75 per cent. It is most expedient for the different hues, which are to be recognised by the arrangement according to the invention, to be formed by dividing the hue circle into 12 parts of equal sensitivity.

The arrangement according to the invention is preferably used in a device according to the aforesaid copending application.

The invention will now be further described by way of example and with reference to the accompanying drawings which represents a block diagram.

According to the diagram, three photoelectric cells 11, 12, and 13, which correspond to the photoelectric cells 45, 44, 43 in FIG. 3 of the aforesaid copending application, are connected to the input of the circuit.

According to the invention, each of the three photoelectric cells 11, 12, 13 is connected via adjustable pre-amplifiers 14, 15, 16 to a minimum formation stage 17 and a maximum formation stage 21. The photoelectric cell 11 receives the red component, the photoelectric cell 12 the green component, and the photoelectric cell 13 the blue component, as is indicated by the letters R, G, and B on the pre-amplifiers 14, 15, and 16 respectively.

The outputs of the pre-amplifiers 14, 15, 16 are in addition each connected to an input of difference amplifiers 18, 19 and 20 respectively, the other inputs of which are connected to the output of the minimum formation stage 17.

The output of the maximum formation stage 21 is connected to a difference amplifier 22, the other input of which is likewise fed by the output of the minimum formation stage 17. The difference amplifiers 18, 19, 20, 22 effect white level compensation.

Comparator devices 23, 24, and 25, each of which is associated with one of the primary colours R, G, B, are connected respectively to the outputs of each of the difference amplifiers 18, 19, and 20.

Each comparator device 23, 24, 25 consists of two individual comparators 23*a*, *b*, 24*a*, *b*, and 24*a*, *b*. The comparators have response thresholds such that the first comparators 23*a*, 24*a*, and 25*a* respond when the signal coming from the difference amplifiers 18, 19, 20 amounts to 40 per cent of the output signal of the difference amplifier 22. The comparators 23*b*, 24*b*, and 25*b* are adjusted to a higher response threshold of about 75 per cent.

The outputs of each individual comparator lead to a logic device 26 which is provided with a switching amplifier and in which the incoming signals are evaluated, so that colour output signals corresponding to the hue to be measured are formed at the output. As an example, the colour outputs indicated in the drawing represent the following:

1 — red, 2 — yellow, 3 — green, 4 — blue, 5 — cyan, 6 — magenta The mode of operation of the arrangement according to the invention is as follows:

The maximum formation stage 21 selects the largest of the three signals R. G. and B coming from the preamplifiers 14, 15, and 16.

The output signal of stage 21 thus corresponds to the colour value of the strongest primary colour plus the white level in which the primary colour in question is of course likewise contained.

At the output of the minimum formation stage 17 a signal appears which reproduces the weakest of the three primary colours R. G. B, that is to say which is representative of the white content of the light measured.

The difference formation effected in the difference formation stages 18, 19 and 20 thus leads to output signals at these stages which reproduce the pure colour values, that is to say without a white component.

Since the white level is likewise deducted in the difference amplifier 22 from the output signal of the maximum formation stage 21, the output signal of the amplifier 22 corresponds to the colour value of the strongest primary colour.

The output signal of the difference amplifier system is now used as reference signal in the comparator devices 23, 24, 25, whereby the influence of alterations in the device i.e. lamp ageing and the like is eliminated.

If only one comparator were used for each comparator device, it would be possible to distinguish a total of six different hues. It should be observed that the arrangement is not able to recognise achromatic colours.

If two individual comparators with response thresholds of 40 and 75 per cent respectively are now used for each comparator device, as illustrated in the block diagram, the arrangement can further distinguish between two different intensity stages within each primary colour.

The illustrated arrangement of two comparators per stage enables 12 different hues to be recognised.

For resolution of this quality the cost for apparatus enabling great accuracy to be achieved is still relatively low. Colour differences of this kind can also be clearly distinguished visually. According to the invention the outputs of the comparators are interconnected in the logic device and in the switching amplifier in such a manner that one to seven digital signals are available at the colour outputs. For each colour of the hue circle there is one output, so that for each measurement only one output indicates a 1, while the other outputs indicate O.

In general the invention therefore provides an arrangement for hue evaluation which with low expenditure for circuitry ensures great accuracy even when the colour marks are not applied sufficiently accurately or cleanly, when the colours have darkened in the course of time, and/or the lighting devices or photoelectric cells have aged.

I claim:

1. A system for hue evaluation having three photoelectric receivers, each of which receives one of the three primary colours of the hue to be evaluated, said receivers forming primary colour signals corresponding to the proportion of the respective primary colour in the hue, a maximum formation stage, a minimum formation stage, said receivers applying said primary colour signals to the maximum and minimum formation stages, three colour difference amplifiers, said minimum formation stage having an output which is conjointly applied to one input of each of said amplifiers, each amplifier having another input receiving one of said primary colour signals, said minimum formation output also being transmitted to an input of a fourth difference amplifier, said maximum formation stage having an output which is transmitted to another input of said fourth amplifier, three comparator devices, said three colour difference amplifiers having outputs each fed to an input of a respective one of said comparator devices, said fourth difference amplifier having an output which is fed to another input of each respective comparator device, and a logic device provided with a switching amplifier, each said comparator device having an output applied to said logic device, whereby a hue output signal is formed from the processed primary colour signals characteristic of the hue.

2. A system according to claim 1, wherein a separately adjustable preamplifier is connected between each photoelectric receiver and said maximum and minimum formation stages.

3. A system according to claim 1, wherein each comparator device comprises a plurality of individual comparators which have different response thresholds and the outputs of which are fed separately to the logic device, one input of each of the said comparators receiving the same input signals.

4. A system according to claim 3, wherein each comparator device comprises two comparators.

5. A system according to claim 4, wherein the response threshold of one comparator of each comparator device lies at 40 percent of one input in relation to the other.

6. A system according to claim 5, wherein the response threshold of the other comparator in each said comparator device lies at 75 per cent.

* * * * *